(12) United States Patent
Lai

(10) Patent No.: US 8,500,076 B2
(45) Date of Patent: Aug. 6, 2013

(54) CUP HOLDER FASTENING STRUCTURE

(76) Inventor: Chin-I Lai, Tainan (TW)

( * ) Notice: Subject to any disclaimer, the term of this patent is extended or adjusted under 35 U.S.C. 154(b) by 0 days.

(21) Appl. No.: 13/305,151

(22) Filed: Nov. 28, 2011

(65) Prior Publication Data

US 2013/0134266 A1    May 30, 2013

(51) Int. Cl.
*B65D 25/00*    (2006.01)
(52) U.S. Cl.
USPC ........ 248/311.2; 248/102; 248/214; 224/409; 224/148.5
(58) Field of Classification Search
USPC ........... 248/311.2, 102, 103, 104, 214, 230.1; 224/148.4, 148.5, 148.6, 409, 414, 926
See application file for complete search history.

(56) References Cited

U.S. PATENT DOCUMENTS

| | | | | |
|---|---|---|---|---|
| 5,042,770 A | * | 8/1991 | Louthan | 248/311.2 |
| 5,400,990 A | * | 3/1995 | Frankel | 248/215 |
| 5,996,957 A | * | 12/1999 | Kurtz | 248/311.2 |
| 6,045,017 A | * | 4/2000 | Connell | 224/148.7 |
| 6,983,918 B1 | * | 1/2006 | Leasure | 248/311.2 |
| 7,533,860 B2 | * | 5/2009 | Somuah | 248/311.2 |
| 8,066,148 B2 | * | 11/2011 | Garahan | 220/737 |
| 8,132,764 B2 | * | 3/2012 | Kuipers | 248/74.3 |

* cited by examiner

*Primary Examiner* — Steven Marsh
(74) *Attorney, Agent, or Firm* — Muncy, Geissler, Olds & Lowe, PLLC

(57) ABSTRACT

A cup holder fastening structure includes a cup body, a fastening means hinged on the cup body and a pivotal unit. The cup body has a first coupling portion extended therefrom. The fastening means includes a strap containing a latch teeth section and a holder. The strap is fastened to an upper end of the holder. The holder has a slot to be threaded through by the strap and a second coupling portion extended from one side to mate the first coupling portion. The pivotal unit is hinged between the first and second coupling portions to adjust the angle of the cup body. Through the strap the invention can be strapped on any type of vehicle bars and installed and removed easily. Through the pivotal unit the cup body can be adjusted to a desired use angle to provide greater usability and practicality.

4 Claims, 9 Drawing Sheets

CUP HOLDER FASTENING STRUCTURE

FIELD OF THE INVENTION

The present invention relates to a fastening structure and particularly to a fastening structure equipped with a cup holder.

BACKGROUND OF THE INVENTION

Baby carriage mainly aims to transport a baby to varying locations. During a baby is carried outdoors parents often have to feed the baby frequently. To meet this purpose the conventional baby carriage has a partitioned pouch at the back side of the baby's lounge seat or a holding net formed in a tray shape below the lounge seat to hold diapers and milk cans and the like. But the nursing bottle which has to be fetched and stored frequently is not easily accessible.

The conventional partitioned pouch or holding net usually is made from fabric. Nursing bottle or drink cans held inside are easily toppled or not readily accessible when the baby carriage is moved. Parents often have to stop moving of the baby carriage to scrounge the partitioned pouch or holding net to get the nursing bottle. It is not convenient and often makes the baby uncomfortable. There is still room for improvement.

SUMMARY OF THE INVENTION

The primary object of the present invention is to overcome the disadvantage of holding a nursing bottle in the conventional approach by providing a cup holder fastening structure with a cup body fastened to a tubular member of a baby carriage so that a nursing bottle can be held and accessed easily to facilitate holding and storing.

To achieve the foregoing object the cup holder fastening structure according to the invention includes a cup body, a fastening means and a pivotal unit. The cup body has a first coupling portion extended from one lateral side thereof with a first trough formed therein. The first trough has a first spline formed on the inner rim and a first hole in the center. The fastening means includes a strap and a holder. The strap is fastened to an upper end of the holder and has a latch teeth section on one side. The holder has a slot on the upper end to be threaded through by the strap, and a second coupling portion extended from one side mating the first coupling portion. The second coupling portion has a second trough corresponding to the first trough and a second spline formed on the inner rim and a second hole in the center and a plurality of apertures surrounding the second hole. The holder at the lateral side further has a housing chamber being opposite to the second trough to hold a stopper. The stopper includes a strut and an anchor portion jutting towards the housing chamber. The strut is coupled with a first spring butting the housing chamber. The pivotal unit includes a pushbutton, a pin, a gear cap and a second spring. The pushbutton has a plurality of legs inserting into the corresponding apertures of the second trough. The gear cap is located between the first trough and second trough and engaged with the first spline and second spline, and also has a recess with a third hole formed in the center. The second spring is compressed between the recess and first trough. The pin runs through via a front end the first hole, third hole and second hole to hinge the cup body on the holder.

By means of the structure set forth above, the invention provides many advantages, notably:

1. Through the pivotal unit between the cup body and fastening means, the cup body forms a suspended angle against the fastening means that can be changed as desired so that users can easily make adjustment at the most suitable use position and angle.

2. Through the latch teeth section of the strap latch position can be adjusted by the users to loosen or tighten the strap as required, therefore the invention is adaptable to all types of vehicle tubular members and easy to install and remove.

3. The invention further can provide an anti-slip band and a pad respectively on the strap and holder so that the strap can be securely and tightly fastened to a vehicle tubular member to enhance vibration resistance and stability.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
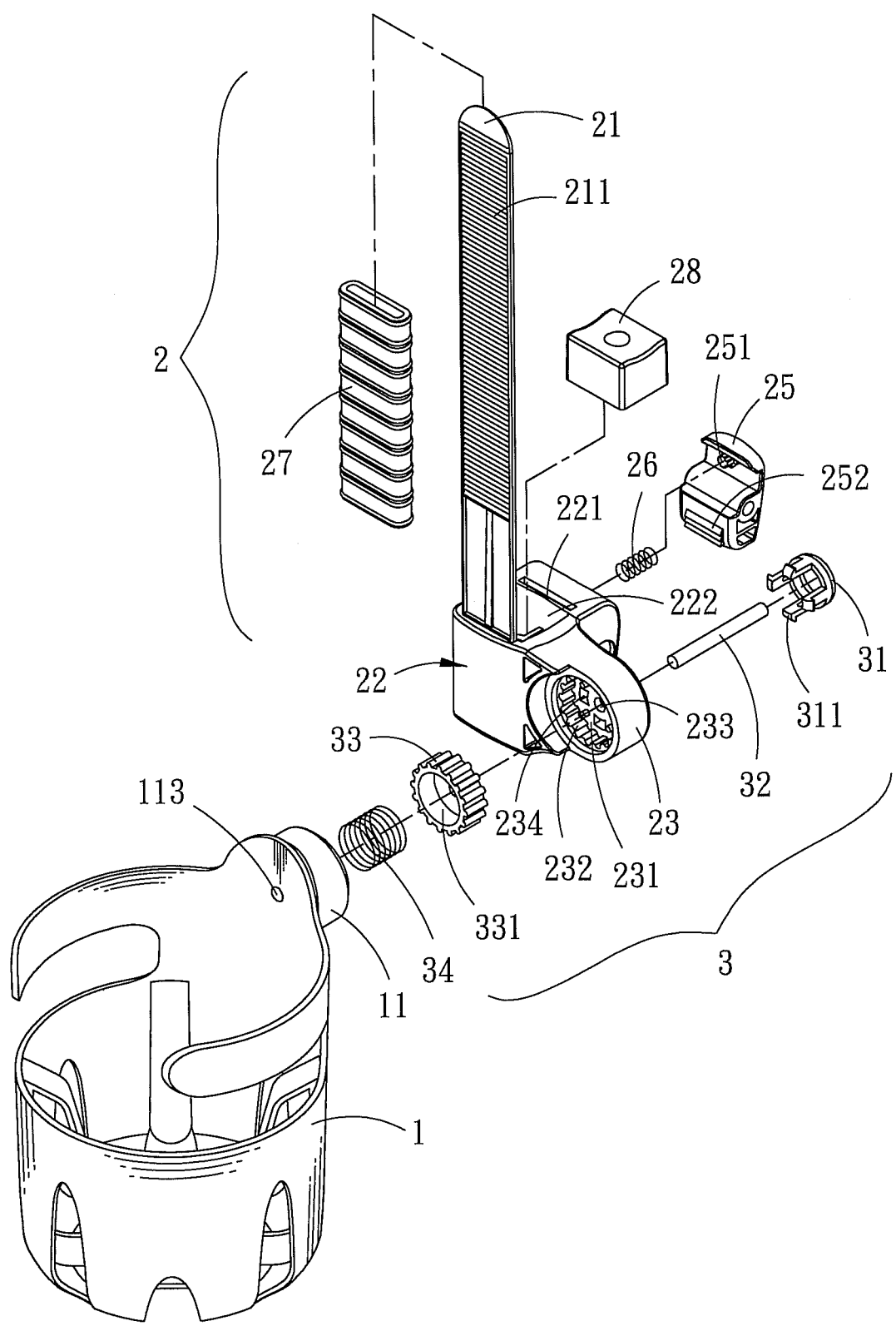
FIG. 1 is an exploded view of the invention.
Figure 2:
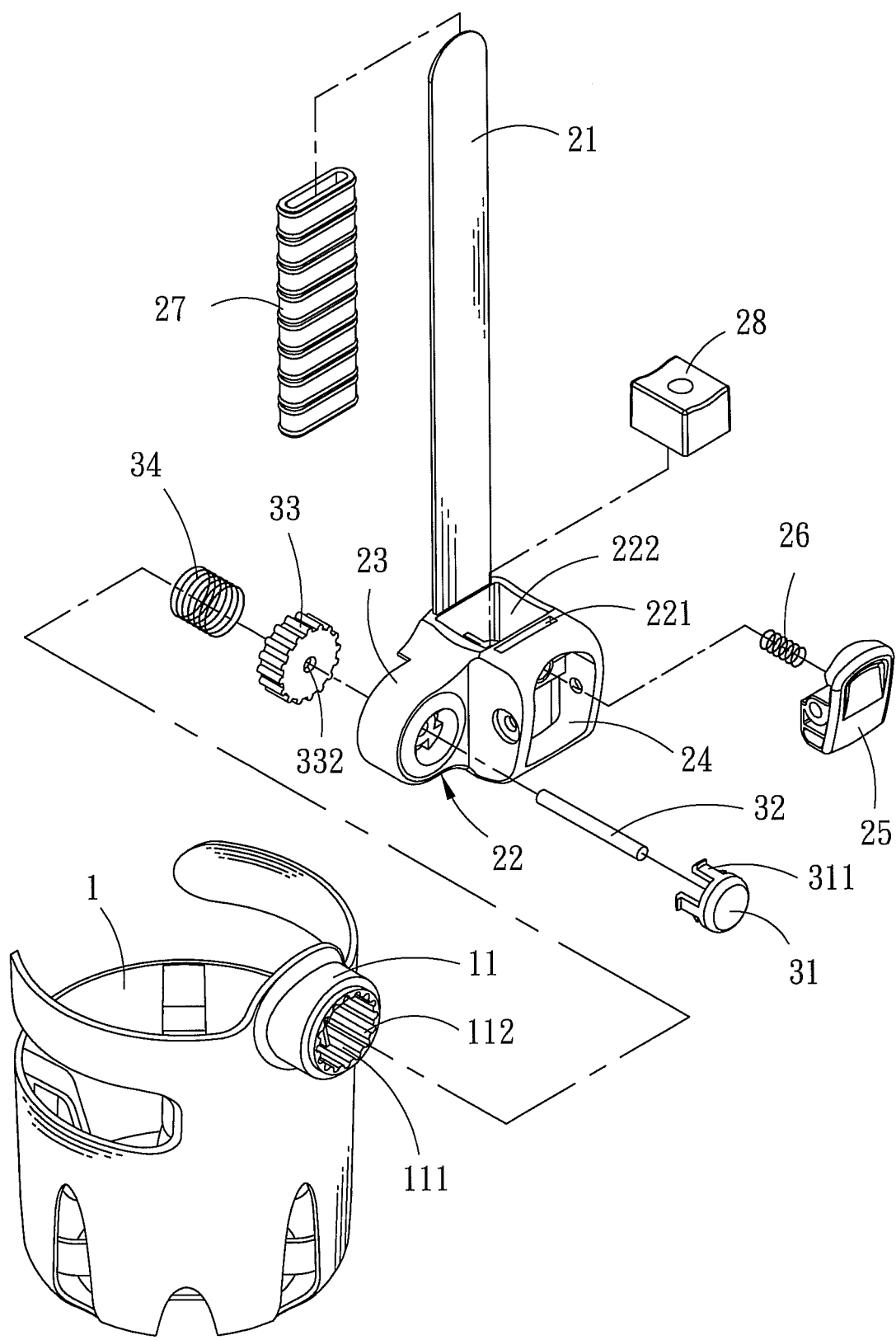
FIG. 2 is another exploded view of the invention according to FIG. 1.
Figure 3:
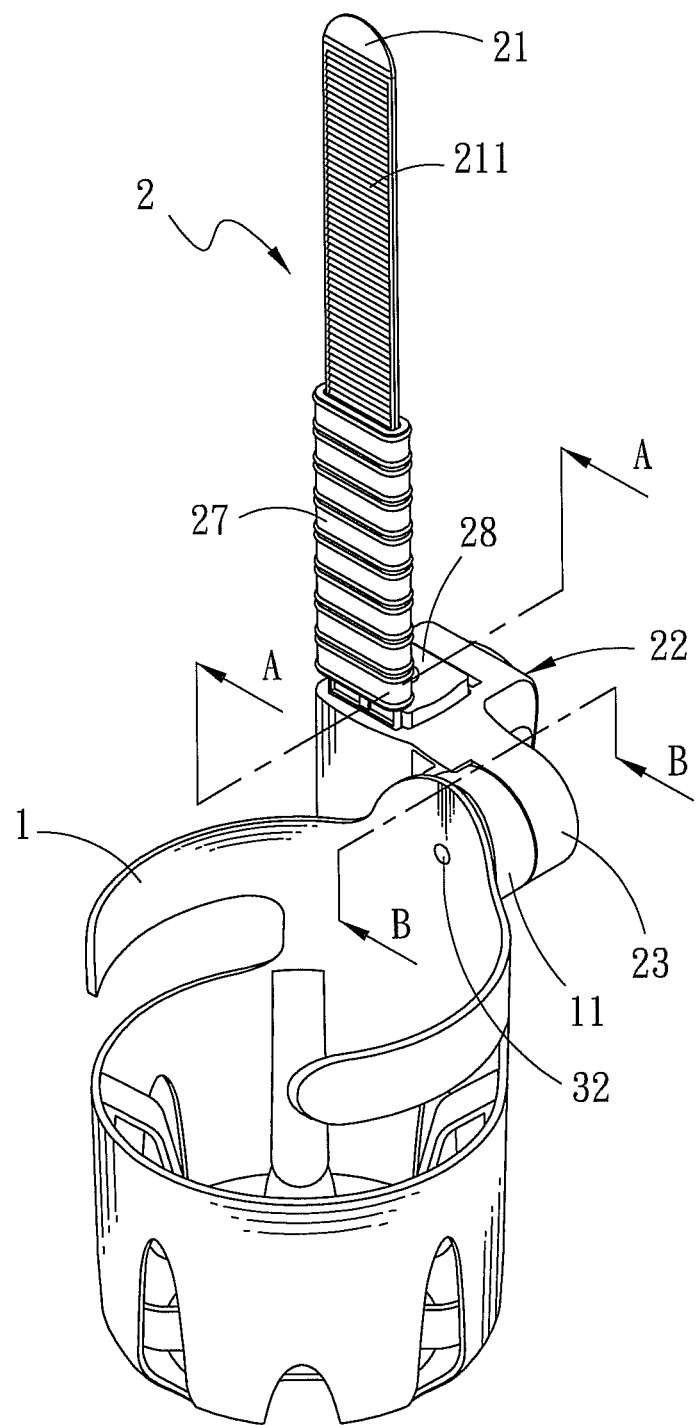
FIG. 3 is a perspective view of the invention according to FIG. 1 in an assembled condition.

Please referring to FIGS. 1, 2 and 3, the present invention aims to provide a cup holder fastening structure that include a seat fastened to a tubular member of a baby carriage to hold a cup. It includes a cup body 1, a fastening means 2 and a pivotal unit 3.

The cup body 1 has a first coupling portion 11 extended from one lateral side thereof with a first trough 111 formed therein. The first trough 111 has a first spline 112 formed on the inner rim and a first hole 113 in the center.

The fastening means 2 includes a strap 21 and a holder 22. The strap 21 is fastened to an upper end of the holder 22 and has a latch teeth section 211 on one side. The holder 22 has a slot 221 on the upper end to be threaded through by the strap 21, and a second coupling portion 23 extended from one side to mate the first coupling portion 11. The second coupling portion 23 has a second trough 231 corresponding to the first trough 111 and a second spline 232 formed on the inner rim and a second hole 233 in the center and a plurality of apertures 234 surrounding the second hole 233. The holder 22 at the lateral side further has a housing chamber 24 being opposite to the second trough 231 to hold a stopper 25. The stopper 25 is pivotally coupled with the housing chamber 24 through a rivet 253 (referring to FIG. 4). The stopper 25 includes a strut 251 and an anchor portion 252 jutting towards the housing chamber 24. The strut 251 is coupled with a first spring 26 butting the housing chamber 24.

The pivotal unit 3 includes a pushbutton 31, a pin 32, a gear cap 33 and a second spring 34. The pushbutton 31 has a plurality of legs 311 corresponding to and inserting into the apertures 234 of the second trough 231. The gear cap 33 is located between the first trough 111 and second trough 231 and engaged with the first spline 112 and second spline 232, and also has a recess 331 with a third hole 332 formed in the center. The second spring 34 is compressed between the recess 331 and first trough 111. The pin 32 runs through via a front end the first hole 113, third hole 332 and second hole 233 to hinge the cup body 1 on the holder 22.

Furthermore, the strap 21 runs through an anti-slip band 27. The holder 22 has an opening 222 on an upper end to hold a pad 28. Thereby, the strap 21 can be wound around a vehicle bar and the anti-slip band 27 and pad 28 can grip the vehicle bar to form a secure fastening to enhance vibration resistance and stability, also prevent abrasion between the strap 21 and vehicle bar.

Figure 4:
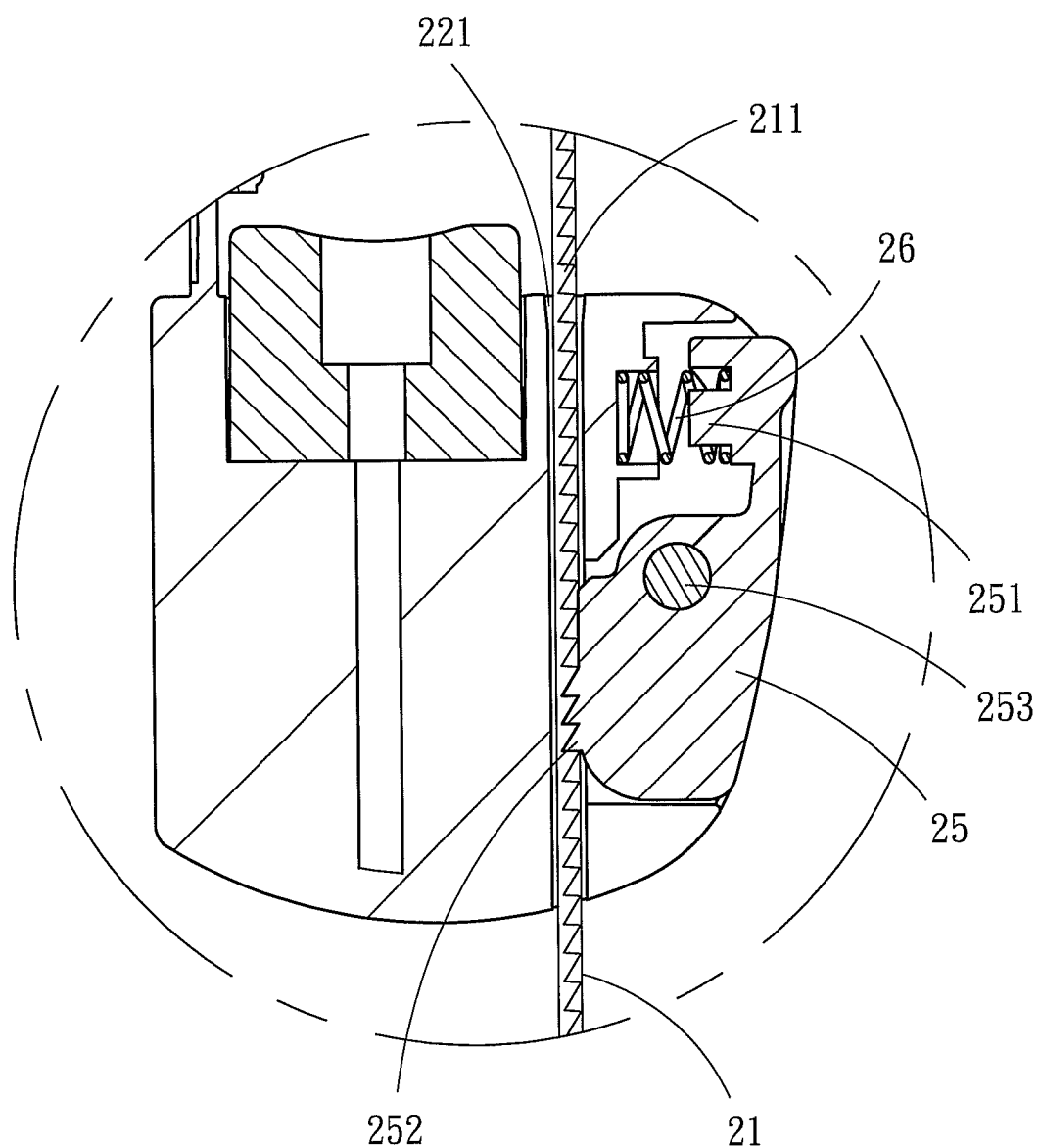
FIG. 4 is a fragmentary sectional view taken on line A-A in FIG. 3.
Figure 5:
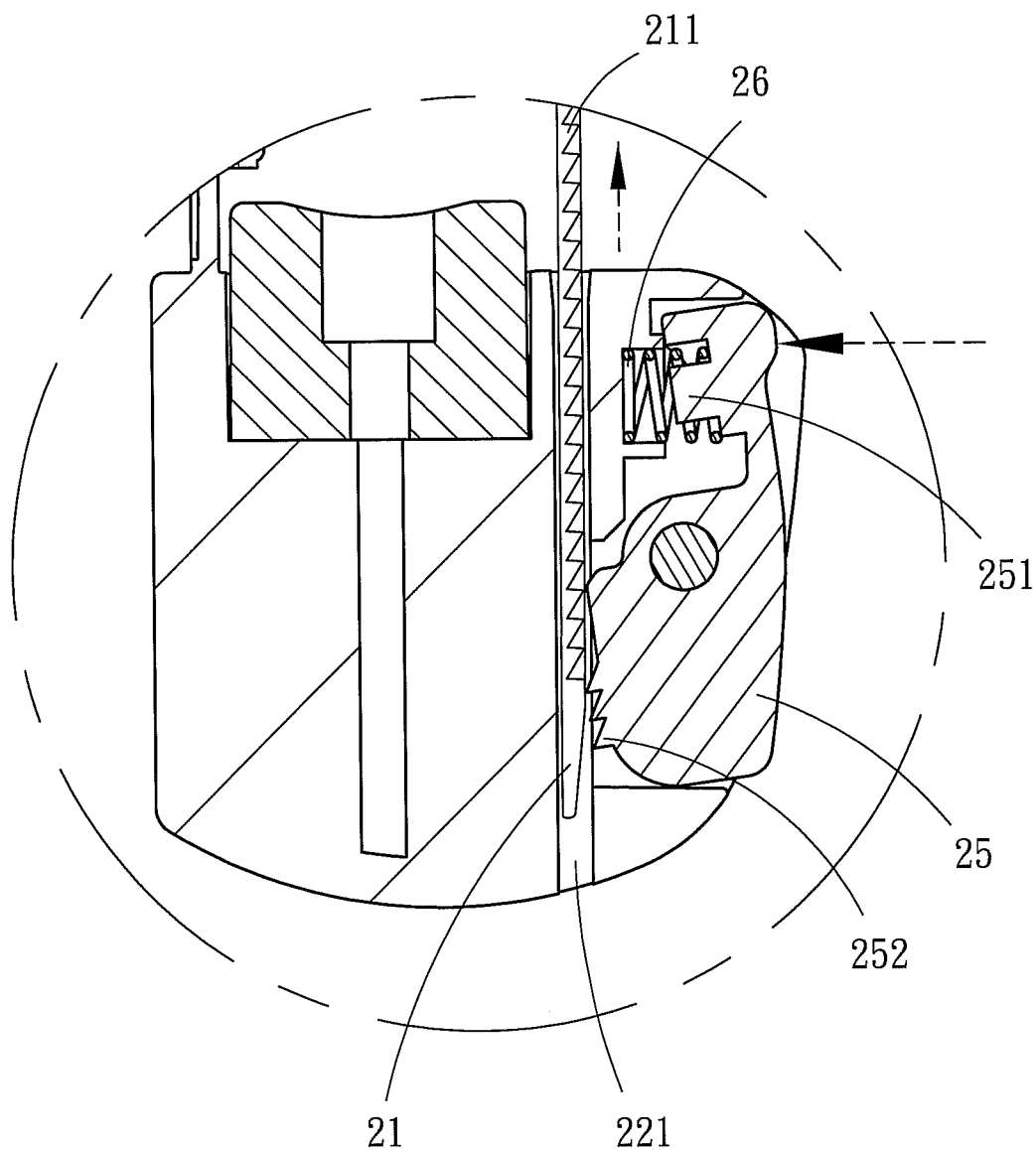
FIG. 5 is a schematic view according to FIG. 4 in a use condition.
Figure 6:
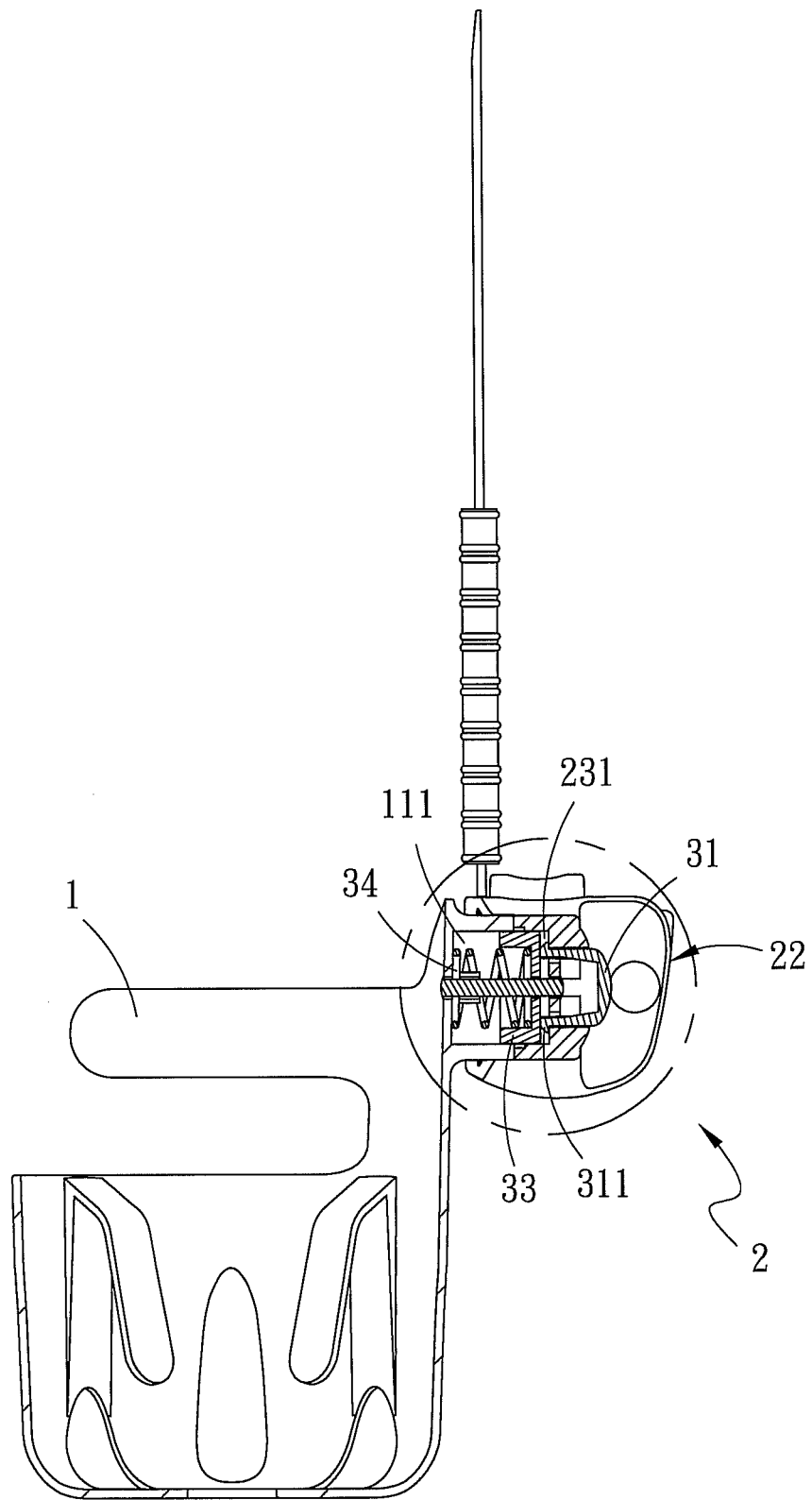
FIG. 6 is a sectional view taken on line B-B in FIG. 3.
Figure 7:
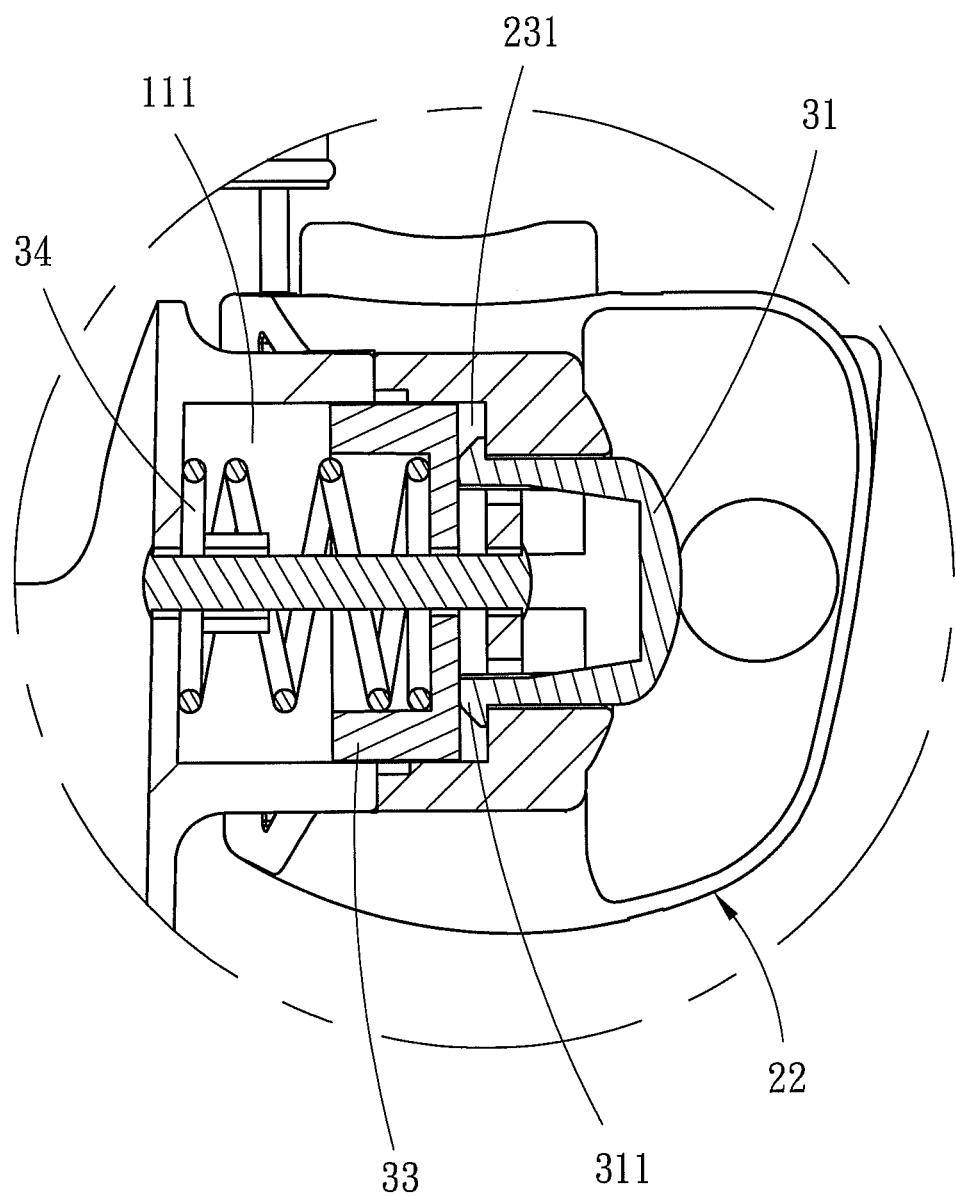
FIG. 7 is a fragmentary enlarged view according to FIG. 6.
Figure 8:
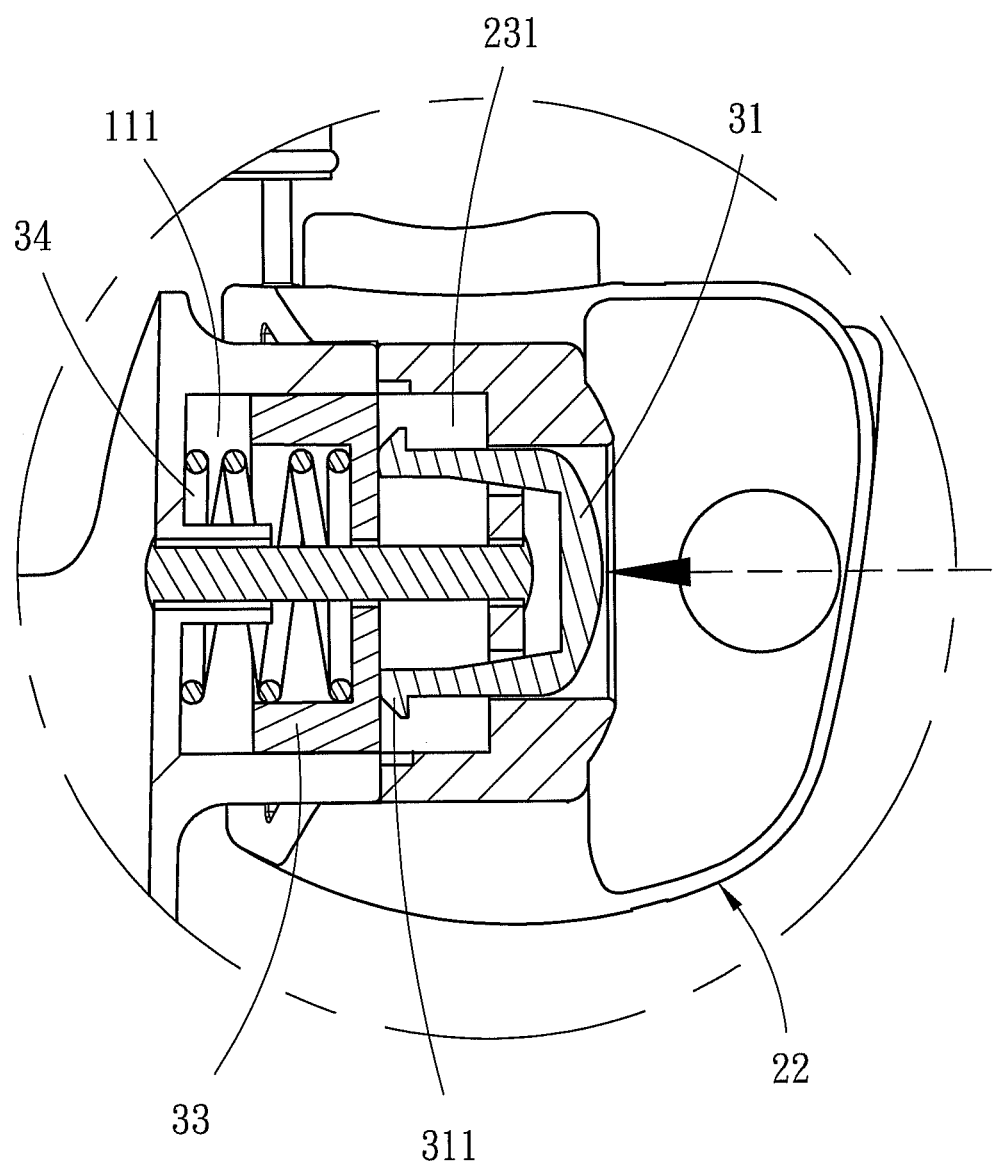
FIG. 8 is a schematic view according to FIG. 7 in a use condition.
Figure 9:
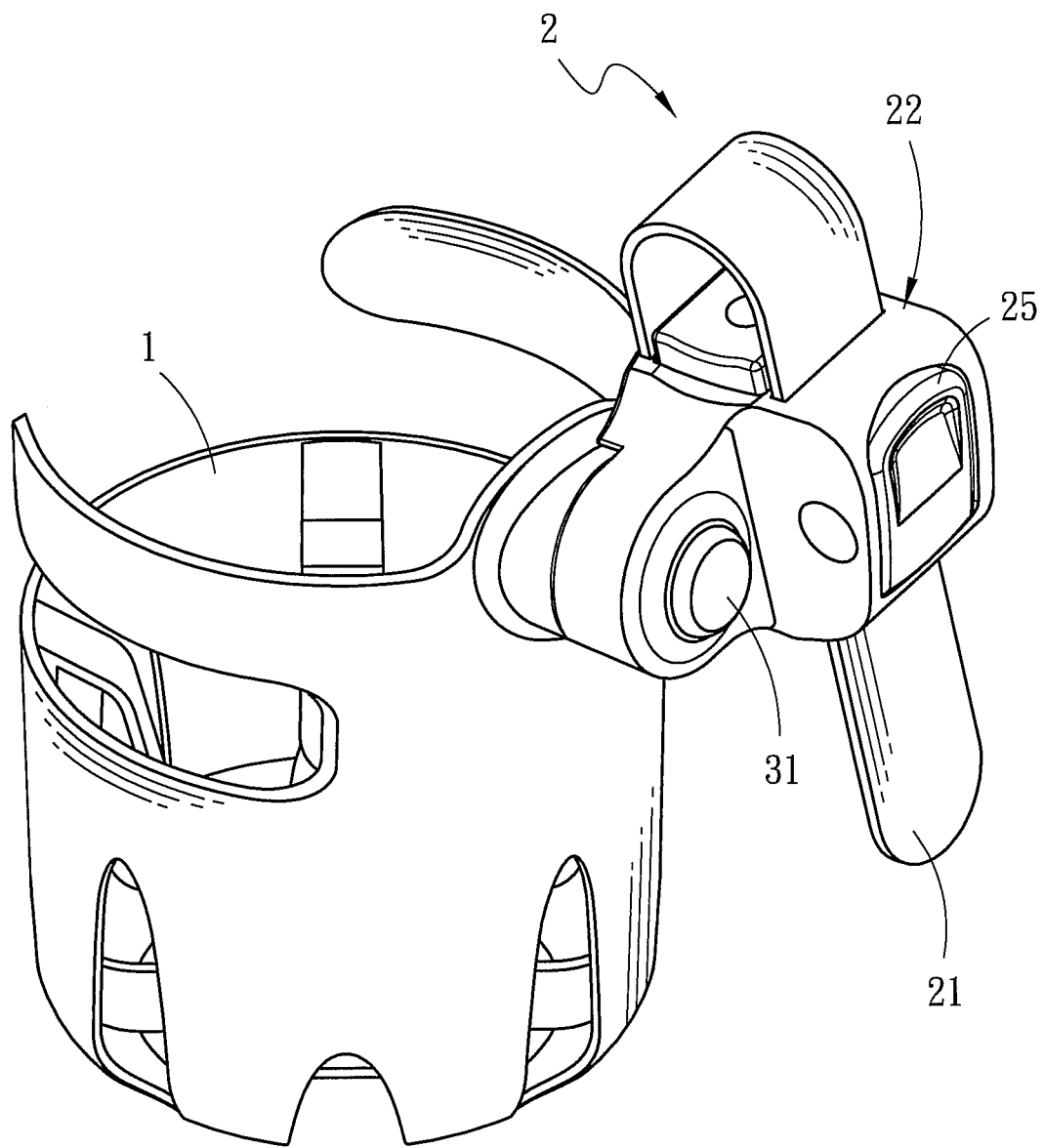
FIG. 9 is a schematic view of the invention in a use condition.

Referring to FIGS. 4, 5 and 9, when the invention is to be suspended on the vehicle bar, thread the strap 21 through the slot 221; the first spring 26, without receiving an external force, pushes the strut 251 away to engage the anchor portion 252 with the latch teeth section 211. By adjusting the engaged position with the latch teeth section 211 the loop size of the strap 21 can be controlled and adjusted. On the other hand, if removing the invention is desired, push the stopper 25 to tilt inwards with the strut 251 compressing the first spring 26, the anchor portion 252 escapes the latch teeth section 211, then the strap 21 can be pulled out through the slot 221. Thus installation and removal are very simple and easy.

Also referring to FIGS. 1, 2, 6, 7, 8 and 9, when the invention is suspended on the vehicle bar, push the pushbutton 31 so that the legs 311 press the gear cap 33 which in turn compresses the second spring 34; the gear cap 33 is moved fully and temporarily from the second trough 231 into the first trough 111, then the holder 22 can be turned freely to allow users to adjust to the most suitable use position and angle. On the other hand, release the pushbutton 31, the second spring 34 bounces back, and the gear cap 33 is moved back to be engaged between the first spline 112 and second spline 232, then the cup body 1 and holder 2 are on a fixed position at the selected angle.

What is claimed is:

1. A cup holder fastening structure, comprising:
a cup body including a first coupling portion extended from one lateral side thereof, the first coupling portion including a first trough which includes a first spline formed on an inner rim of the first trough and a first hole in a center of the first trough;
a fastening means including a strap and a holder; the strap being fastened to an upper end of the holder and containing a latch teeth section on one side; the holder including a slot on the upper end to be threaded through by the strap and a second coupling portion extended from one side of the holder to mate the first coupling portion, the second coupling portion including a second trough corresponding to the first trough; the second trough includes a second spline formed on an inner rim of the second trough and a second hole in a center of the second trough and a plurality of apertures surrounding the second hole; the holder at the lateral side further comprising a housing chamber being opposite to the second trough to hold a stopper; the stopper including a strut and an anchor portion jutting towards the housing chamber, the strut being coupled with a first spring butting the housing chamber; and
a pivotal unit including a pushbutton, a pin, a gear cap and a second spring; the pushbutton including a plurality of legs inserting into the apertures of the second trough; the gear cap being located between the first trough and second trough and engaged with the first spline and the second spline, and also including a recess which forms a third hole in a center of the gear cap; the second spring being compressed between the recess and the first trough, the pin running through the first hole, the third hole and the second hole to hinge the cup body on the holder.

2. The cup holder fastening structure of claim 1, wherein the strap further runs through an anti-slip band.

3. The cup holder fastening structure of claim 1, wherein the holder further includes an opening on an upper end to hold a pad.

4. The cup holder fastening structure of claim 2, wherein the holder further includes an opening on an upper end to hold a pad.

* * * * *